(12) United States Patent
O'Driscoll et al.

(10) Patent No.: US 10,108,708 B2
(45) Date of Patent: Oct. 23, 2018

(54) SYSTEM AND METHOD OF CLASSIFYING, COMPARING AND ORDERING SONGS IN A PLAYLIST TO SMOOTH THE OVERALL PLAYBACK AND LISTENING EXPERIENCE

(71) Applicant: SPOTIFY AB, Stockholm (SE)

(72) Inventors: Brendan O'Driscoll, Dublin (IE); Craig Watson, Dublin (IE); Aidan Sliney, Dublin (IE); George Boyle, Dublin (IE); Clodagh McCarthy Luddy, Dublin (IE)

(73) Assignee: SPOTIFY AB, Stockholm (SE)

( * ) Notice: Subject to any disclaimer, the term of this patent is extended or adjusted under 35 U.S.C. 154(b) by 0 days.

(21) Appl. No.: 15/087,455

(22) Filed: Mar. 31, 2016

(65) Prior Publication Data

US 2016/0292272 A1    Oct. 6, 2016

Related U.S. Application Data

(60) Provisional application No. 62/141,384, filed on Apr. 1, 2015.

(51) Int. Cl.
*G06F 17/30* (2006.01)

(52) U.S. Cl.
CPC .... *G06F 17/30778* (2013.01); *G06F 17/3053* (2013.01); *G06F 17/30053* (2013.01); *G06F 17/30115* (2013.01); *G06F 17/30761* (2013.01)

(58) Field of Classification Search
None
See application file for complete search history.

(56) References Cited

U.S. PATENT DOCUMENTS

| | | | | |
|---|---|---|---|---|
| 6,175,844 B1* | 1/2001 | Stolin | ............... | G06K 9/00463 382/180 |
| 2008/0309647 A1* | 12/2008 | Blose | ............... | G06F 17/30038 345/204 |
| 2009/0063971 A1* | 3/2009 | White | ............... | G06F 3/04817 715/716 |
| 2009/0217804 A1* | 9/2009 | Lu | ..................... | G10H 1/0058 84/602 |
| 2009/0300008 A1* | 12/2009 | Hangartner | ....... | G06F 17/30053 |

(Continued)

FOREIGN PATENT DOCUMENTS

| EP | 2843860 A1 | 3/2015 |
|---|---|---|
| WO | 2016156555 | 10/2016 |

OTHER PUBLICATIONS

International Search Report and Written Opinion issued by European Patent Office for PCT Application No. PCT/EP2016/057177, dated Jun. 13, 2016. (12 pages.).

(Continued)

*Primary Examiner* — Hung Q Pham
(74) *Attorney, Agent, or Firm* — Tucker Ellis LLP

(57) ABSTRACT

The invention provides an apparatus, system and method for the comparison between songs to analyze how similar each song is to the next using a new system of classification. A new and improved method and apparatus for the weighting of these comparable variables between songs in order to find the best objective criteria for finding a likeness between songs is disclosed. The time complexity associated with the computation of the optimal path for smoothing a playlist of songs is substantially reduced using the system of classification.

20 Claims, 12 Drawing Sheets

(56) References Cited

U.S. PATENT DOCUMENTS

2010/0205222 A1* 8/2010 Gajdos .............. G06F 17/30766
707/803
2010/0325135 A1* 12/2010 Chen ................ G06F 17/30053
707/759

OTHER PUBLICATIONS

Steffen Pauws et al: "Fast Generation of Optimal Music Playlists using Local Search", dated Dec. 31, 2006. (6 pages.).
Linxing Xiao et al: "Learning a music similarity measure on automatic annotations with application to playlist generation," Acoustics, Speech and Signal Processing, 2009. ICASSP 2009. IEEE International Conference on, IEEE, Piscataway, NJ, US, dated Apr. 19, 2009. (4 pages.)
Gartner D. et al: "An Adaptive Distance Measure for Similarity Based Playlist Generation," 2007 IEE International Conference on Acoustics, Speeach, and Signal Processing Apr. 15-20, 2007, Honolulu, HI US, IEEE, Piscataway, NJ, US, dated Apr. 15, 2007. (4 pages.).
Logan B. et al: "A music similarity function based on signal analysis", Multimedia and Expo, 2001, ICME 2001, IEE International Conference on, Advanced Distributed Learning, dated Aug. 22, 2001. (4 pages.).
PCT International Preliminary Report on Patentability dated Mar. 10, 2017 for PCT Application No. PCT/EP2016/057177, 5 pages.

* cited by examiner

System Overview

Server Clients

| Feature | Name | Artist | Genre | Tempo (bpm) | Key (0-11) | Timbre (1-12) | Loudness (-60-20 dB) | Duration (secs) |
|---|---|---|---|---|---|---|---|---|
| Result | 'Gimme Shelter' | The Rolling Stones | Rock (25 Of 126) | 118 | C = 1 | 11 | 17 | 278 |
| Range | 0 | Same Name (y/n) | 15 | 15 | 3 | 4 | 20 | 30 |
| Weight (0-1) | 0 | 0.9 | 0.7 | 0.3 | 0.8 | 0.2 | 0.6 | 0.1 |

20 – Result
21 – Range
22 – Weight

FIG. 6

Song A:

| Feature | Name | Artist | Genre | Tempo (bpm) | Key (0-11) | Timbre (1-12) | Loudness (-60-20 dB) | Duration (secs) |
|---|---|---|---|---|---|---|---|---|
| Result | 'Gimme Shelter' | The Rolling Stones | Rock (25 of 126) | 118 | C = 1 | 11 | 17 | 278 |

23

Song B:

| Feature | Name | Artist | Genre | Tempo (bpm) | Key (0-11) | Timbre (1-12) | Loudness (-60-20 dB) | Duration (secs) |
|---|---|---|---|---|---|---|---|---|
| Result | 'Summer Time' | Ella Fitzgerald | Jazz (42 of 126) | 67 | B = 11 | 3 | 5 | 228 |
| Range | 0 | Same Name (y/n) | 15 | 15 | 3 | 4 | 20 | 30 |
| Weight (0-1) | 0 | 0.9 | 0.7 | 0.3 | 0.8 | 0.2 | 0.6 | 0.1 |
| Match (0-1) | 0 | 0 | 0 | 0 | 0 | 0 | 1 | 0 |
| Match With Weight | 0 | 0 | 0 | 0 | 0 | 0 | 0.6 | 0 |

24 – Weight
25 – Match
26 – Match With Weight

FIG. 7

| | Feature | Name | Artist | Genre | Tempo (bpm) | Key (0-11) | Timbre (1-12) | Loudness (-60-20 dB) | Duration (secs) |
|---|---|---|---|---|---|---|---|---|---|
| Song A / 27 | Result | 'Gimme Shelter' | The Rolling Stones | Rock (25 of 126) | 118 | C = 1 | 11 | 17 | 278 |
| Song C / 28 | Feature | Name | Artist | Genre | Tempo (bpm) | Key (0-11) | Timbre (1-12) | Loudness (-60-20 dB) | Duration (secs) |
| | Result | 'Baba O' Riley' | The Who | Rock (25 of 126) | 115 | C# = 2 | 9 | 14 | 318 |
| | Range | N/A | Same Name (y/n) | 15 | 15 | 3 | 4 | 20 | 30 |
| | Weight (0-1) | N/A | 0.9 | 0.7 | 0.3 | 0.8 | 0.2 | 0.6 | 0.1 |
| | Match (0-1) | N/A | 0 | 1 | 1 | 1 | 1 | 1 | 0 |
| | Match With Weight | 0 | 0 | 0.7 | 0.3 | 0.8 | 0.2 | 0.6 | 0 |

FIG. 8

| Name | Artist | Similarity Score Aggregated w/weighting (29) | Similarity Score Aggregated/weighting (0-1) (30) |
|---|---|---|---|
| 'Gimme Shelter' | The Rolling Stones | ◆ | ◆ |
| 'Summertime' | Ella Fitzgerald | 0.6 | -0.18 |
| 'Baba O 'Riley' | The Who | 2.6 | -0.82 |

FIG. 9

|   | A | B | C | D | E |
|---|---|---|---|---|---|
| A | ◆ | -0.29 | -0.83 | -0.56 | -0.11 |
| B | -0.29 | ◆ | -0.38 | -0.72 | -0.19 |
| C | -0.83 | -0.38 | ◆ | -0.22 | -0.77 |
| D | -0.56 | -0.72 | -0.22 | ◆ | -0.40 |
| E | -0.11 | -0.19 | -0.77 | -0.40 | ◆ |
FIG. 10
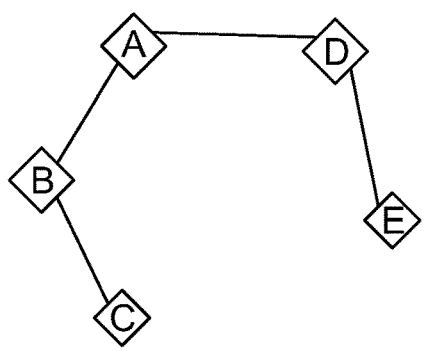
FIG. 11
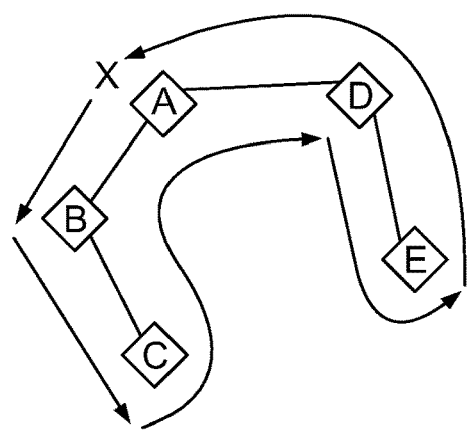
FIG. 12
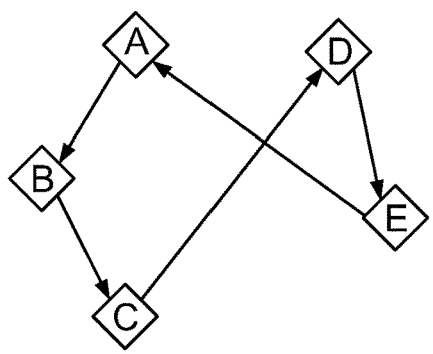
FIG. 13
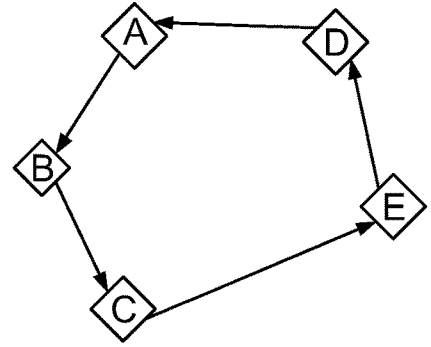
FIG. 14

| Order | Name | Artist | Genre | Similarity Score |
|---|---|---|---|---|
| E | 'Seven Nation Army' | The White Stripes | Rock | ◆ |
| C | 'Figure It Out' | Royal Blood | Rock | -0.77 |
| A | 'My Hero' | The Foo Fighters | Rock | -0.83 |
| D | 'Whole Lotta Love' | Led Zeppelin | Rock | -0.56 |
| B | 'Next Girl' | The Black Keys | Rock | -0.72 |

Total = -2.88

SYSTEM AND METHOD OF CLASSIFYING, COMPARING AND ORDERING SONGS IN A PLAYLIST TO SMOOTH THE OVERALL PLAYBACK AND LISTENING EXPERIENCE

CLAIM OF PRIORITY

This application claims the benefit of priority to U.S. Provisional Patent Application No. 62/141,384, titled "A system and method of classifying, comparing and ordering songs in a playlist to smooth the overall playback and listening experience", filed Apr. 1, 2015, which is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention relates generally, as indicated, to system and method of comparing and ordering songs in a playlist to smooth the overall playback and listening experience for an end user.

DESCRIPTION OF RELATED ART

In recent times, there has been a rise of on demand music streaming services with their vast catalogues of millions of songs. This means that ownership of a physical music file or a digital music file is no longer required to enjoy music. The state of the art allows subscribers to access this content whenever and wherever they want on their electronic devices through any number of free or paid subscription services. The net result is that it has never been easier to listen to music on the go either in an individual or group capacity.

The existence of all this easily accessible content has led to consumers now facing an overwhelming song choice as there are often over 20 million tracks available on most of the established content providers. In order to combat this 'search bar paralysis' when looking for music, a number of services have introduced dedicated playlist functionality to allow consumers to sort and make sense of these vast databases of music.

The curation of music into playlists or other queues of specific songs is well established but despite these advancements in accessibility to media content and on demand playback, the process of adding songs into a playlist and consuming this music is generally left up to the sequential ordering of the songs as they are placed in a particular playlist.

As such, the current state of the art for playlist generation still requires an unnecessary amount of manual input. Although the majority of existing music services have some form of playlist functionality, there is an onus on the music service subscriber to manually select the way that the songs in a particular playlist are ordered. This can result in a poor and jarring listening experience for the end user as a slow relaxing song can be followed by a much louder high tempo song if it has been arbitrarily chosen as the next song to be queued in that playlist.

By way of example, if a user is creating a playlist for a party, they may add songs to a playlist entitled 'Party Playlist'. Such songs may differ from one another greatly through a number of metadata variables such as tempo, loudness, key and mode. The various songs added to the Party Playlist may even differ in other more obvious ways such as genre type (e.g., Rock and Jazz).

It is clear to any music fan that 'Gimme Shelter' by the Rolling Stones is patently different to Ella Fitzgerald's 'Summertime'. However, the current state of the art provides that if twenty songs were added to the Party Playlist as described and 'Gimme Shelter' was followed by 'Summertime', these songs would be played in order. This is despite the fact that these songs have very little in common and would result in a noticeable change during playback of the Party Playlist. It is noted that playlists can be often be played in a random order so that the songs are not played sequentially. This approach may also lead to a jarring listening experience if the songs in a playlist differ in any substantive way.

This is not an easy problem to solve as any method of smoothing a playlist would first require a way to classify each song by a number of variables in order to accurately index what type of song it is. Next there would need to be some logic to compare these characteristics from one song to another. Finally, there would need to be a way to map out which path the playlist should follow from start to finish so that each song in the list is followed by the next closest fit.

It should be noted that there are a number of third party services that have classified huge catalogues of music using a wide range of variable characteristics. The Echo Nest for example has created "Analyze", a music audio analysis tool available as a free public web API (visit developer.echonest.com). The program takes a digital audio file from disk (e.g., mp3, m4a, way, aif, mov, mpeg, fly), or audio data piped in on the command line. It generates a JSON-formatted text file that describes the track's structure and musical content, including rhythm, pitch, and timbre and all information is precise to the microsecond (audio sample). This is only one approach though to song classification and there are numerous additional ways to classify songs according to the present invention.

Indexing these song characteristics is of little value for the purposes of smoothing a playlist unless there is a method and system of comparing and ordering of the songs in such a playlist. Therein the state of the art is not satisfactory and the problem of providing a smooth listening experience to an end user is too manual and at best left to chance.

In order to compare songs to one another, there should exist a system and method of weighting each of the variables between songs so that they can be mapped in order of similarity. Then much like navigating between different points on a map, the course of least resistance needs to be worked out in advance.

There are other reasons why this method of comparing and smoothing songs in a playlist would be of value such as playback. Disc Jockeys (DJs) for example would be able to populate a playlist to find out the most optimal way of playing their set (e.g., by which songs had the closest tempos or key). Songs in a playlist could also be clustered around any predetermined filters such as tempo or key so and each cluster could then have its own system of smoothing applied to best suit that group. So a DJ could navigate between different genres seamlessly with each subset of songs for each genre smoothed in advance.

The issue is that there is a time complexity, as identified by the field of computer science, in working out such a path for an exponential problem. The more songs added to the playlist, the more computations that are required to find out what the smoothest set list would be.

Taking the above example of the Party Playlist, where that playlist contains ten songs. Given a starting song (we can choose any song since it will be somewhere on the path) there are N−1 choices for the second song in the path, N−2 choices for the third song in the path, and so on, leaving (N−1)! factorial possible paths: (N−1)!=(N−1)·(N−2)·(N−3)· . . . ·1.

To determine which of these paths is shortest, the current state of the art would necessitate that all of the paths are tested (this is referred to as a brute force search). This is an extremely timely computation. Time complexity is commonly estimated by counting the number of elementary operations performed by the algorithm, where an elementary operation takes a fixed amount of time to perform.

For 11 songs in a playlist, 10! is the number of possible paths, or 3,628,800 paths one has to examine to see which is the most optimal one. This is an exponential time problem. If you increase the number of outputs, then the time complexity quickly becomes enormous.

For example, if one increases it to only 20 songs in a playlist, then $1.2*10^{17}$ paths are possible. In order to compute the most optimal path between the first and twentieth song, it can be shown that under the current state of the art, it would take a computer that can do about 1 billion instructions per second (1 GHz) over three quarters of a century to work out every permutation. This is assuming that each 20 song path takes about 20 operations to compute, so that one can calculate 50 million paths per second. So in 1 day, a computer can calculate 4,320,000,000,000 paths.

To find out how many days this computation would take and what the worst case time-complexity would be divide:

$$1.2*10^{17}/4.32*10^{12}$$

This equals $0.28*10^5$ days=28000 days=76 years in total.

This worst case time-complexity is an impossibly expensive computation to make and for this reason it can be seen why the state of the art does not provide for an efficient and optimal method of ordering songs in a playlist of any length.

SUMMARY

According to the invention there is provided a system, apparatus and method as set out in the appended claims.

The invention solves the above mentioned problem by firstly analysing the various characteristics of each song in a playlist. By indexing each song in a playlists in this manner, a user is able to gain a much deeper understanding about each song.

In order to accurately compare and contrast one song from the next, the invention utilises a complex system and method of weighting for each different variable. For example, the tempo of a song is much more relevant when comparing songs than the length of time of each song. Taking the example of The Rolling Stone's 'Gimme Shelter' and Ella Fitzgerald's 'Summertime' both songs may be similar in length but will differ substantially in tempo. As such, when comparing these two songs, more weight should be attributed to tempo then to song length.

Once it is known how similar each song in a playlist is compared to one another (for example a range so that 0 result is of no similarity and a 1 result would mean exact similarity), the invention next computes the most efficient way to order these songs. As mentioned above, a playlist of just 20 songs could take a modern computer upwards of 76 years to work out each possible path. The invention uses an established algorithm used in the field of computer science called the Optimal Hamiltonian Path algorithm to find the most efficient path between the songs in any given playlist.

Although there may be some relative error in using this algorithm (e.g., from the brute force mechanism of computing each possible path) such an approximation is offset by the enormous savings made in time complexity. In practical terms, this means that a playlist can be ordered in fractions of a second and the end user can enjoy a smooth listening experience without needing to wait for the all possible paths to be worked out.

The present invention is an improvement over conventional systems in that method and apparatus for classifying, comparing and ordering songs in a playlist to smooth the overall listening experience for an end user. In addition this invention can be used by anyone, including DJs, to curate a playlist in the most efficient manner and as quickly as possible to assist with playback.

It is therefore an object of the present invention to provide a new and improved method and apparatus for the classification of a digital music file.

It is therefore an object of the present invention to provide a new and improved method and apparatus for the comparison between songs to analyse how similar each song is to the next using the above mentioned system of classification.

It is therefore an object of the present invention to provide a new and improved method and apparatus for the weighting of these comparable variables between songs in order to find the best objective criteria for finding a likeness between songs.

It is therefore an object of the present invention to provide a new and improved method and apparatus for the ordering of songs in a playlist based on their similarity to one another.

It is therefore an object of the present invention to provide a new and improved method and apparatus for the improving the time complexity associated with the computation of the optimal path for smoothing a playlist of songs.

It is another object of the present invention to provide a new and improved system and method that is capable of filtering results in order to group or cluster songs around any set parameters.

Other objects, features and advantages of the invention will be apparent from the following detailed disclosure, taken in conjunction with the accompanying sheets of drawings, wherein like reference numerals refer to like parts.

BRIEF DESCRIPTION OF THE DRAWINGS

The invention will be more clearly understood from the following description of an embodiment thereof, given by way of example only, with reference to the accompanying drawings, in which:

FIG. 6 is an example of the classification system used for one particular song.

FIG. 7 is an example of a similarity table between two different songs.

FIG. 8 is a further example of a similarity table between two different songs.

FIG. 9 is one embodiment of a similarity table comparing two different songs to one reference point.

FIG. 10 is an example of a table format view for a graph with five different vertices.

FIG. 11 is a schematic view of a minimum spanning tree of the complete graph.

FIG. 12 is a schematic view highlighting a walk of the spanning tree.

FIG. 13 is a schematic view of a tour obtained by visiting the vertices in the order given by the preorder walk.

FIG. 14 is a schematic view of an optimal tour for the original complete graph.

DETAILED DESCRIPTION

Figure 1:
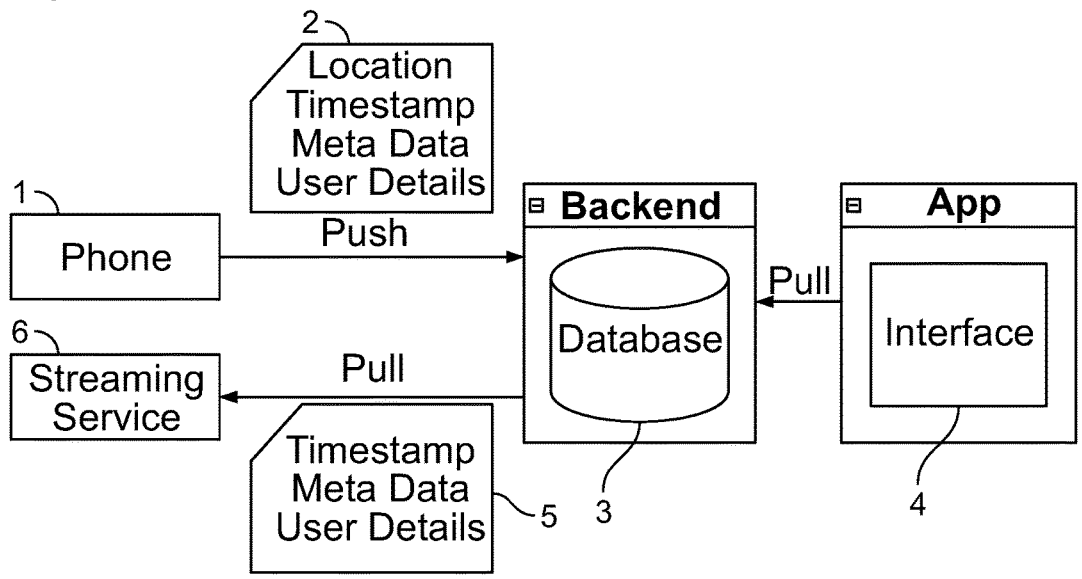
FIG. 1 is a diagram of a system for identifying music or other audio metadata.

A system and method of classifying, comparing and ordering songs in a playlist to smooth the overall playback and listening experience is described. While this invention is susceptible of embodiment in many different forms, there is shown in the drawings and will herein be described in detail several specific embodiments, with the understanding that the present disclosure is to be considered merely an exemplification of the principles of the invention and the application is limited only to the appended claims.

FIG. 1 is a diagram of a system for identifying played content on a smart-phone device, according to one embodiment. By way of example, the communication between push of location, timestamp, metadata and user details at 2 between the device 1 and the backend 3 and the communication between the pull of location, timestamp, metadata and user details at 5 between the backend 3 and the content provider 5 can include one or more networks such as a data network (not shown), a wireless network (not shown), a telephony network (not shown) or any combination thereof. It is contemplated that the data network may be any local area network (LAN), metropolitan are network (MAN), wide area network (WAN), the Internet, or any other suitable packet-switched network.

The system set out in FIG. 1 included a music identification and classification service 1, 2, 5 and 6 and a database interface process 3. The system includes instructions for finding metadata about music or other audio files. The database interface process 3 is the interface between the device 1 and the content database 6, and is used to retrieve and store metadata, and to retrieve and store content.

In the illustrated embodiment, the services include played content identification process 2 and 5 to identify played music or other audio metadata and to use the database interface process 3 to store and retrieve the event data that describes what is being played, where it being played and when.

In step 2, the event generator process detects the initial operation of the device, such as during power up or movement to a cell of a different base station or access point. An event geolocation message is sent for receipt by the content service system. In some embodiments of 2 and 5 the user ID field 2 and 5 may be used, such as a node identifier for the device used for playback, a user supplied name, an email address or an ID assigned to a user who registers with a content service system (e.g., Facebook). In steps 2 and 5, the timestamp field is also retrieved which holds data that indicates when the event occurred on the device that plays the content. In some embodiments, the timestamp is omitted. The content ID in steps 2 and 5 holds data that uniquely identifies the content being played (e.g., the music or audio metadata).

In circumstances where the music or audio metadata is not stored on the device 1, and pushed 2 to the database 3, often a Content Distribution Network (CDN) as embodied in 6 is the source of the music or audio metadata. Typically, the music store authorizes the CDN to download the client and then directs a link on the user's browser client to request the content from the CDN. The content is delivered to the user through the user's browser client as data formatted, for example, according to HTTP or the real-time messaging protocol (RTMP). As a result, the content is stored as local content 6 on the user's device 1. The local content arrives on the device either directly from the CDN or indirectly through some other device (e.g., a wired note like other host) using a temporary connection (not shown) between mobile terminal for example and other host.

Once this information has been added to the database 3 and stored locally, the application itself 4 on a user's mobile device can then be used to access and retrieve the music or other audio metadata. Depending on the availability of the location, metadata, user details and timestamp, an app developer can therefore use the present invention to distinguish what music or other audio file was played, when it was played, where it was played and by whom.

Figure 2:
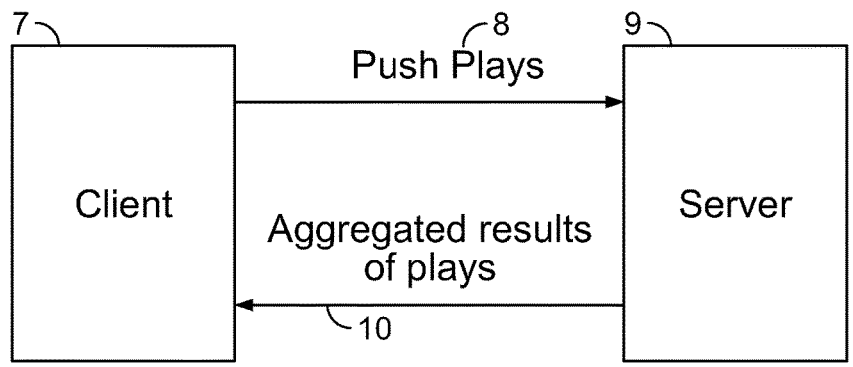
FIG. 2 is a diagram of the server to client interaction that is used to implement an embodiment of the invention.

FIG. 2 is a diagram of the server to client interaction that is used to implement an embodiment of the invention. The client-server model of computer process interaction is widely known and used. According to the client-server model, a client process 7 sends a message including a request to a server process 9, and the server process responds by providing a service. The server process 9 may also return a message with a response to the client process 7. Often the client process and server process 9 execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" 7 and "server" 9 refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others. In this case, the client 7 pushes plays 8 to the server 9 which then returns the aggregated results of the plays 10 back to the client 7.

Figure 3:
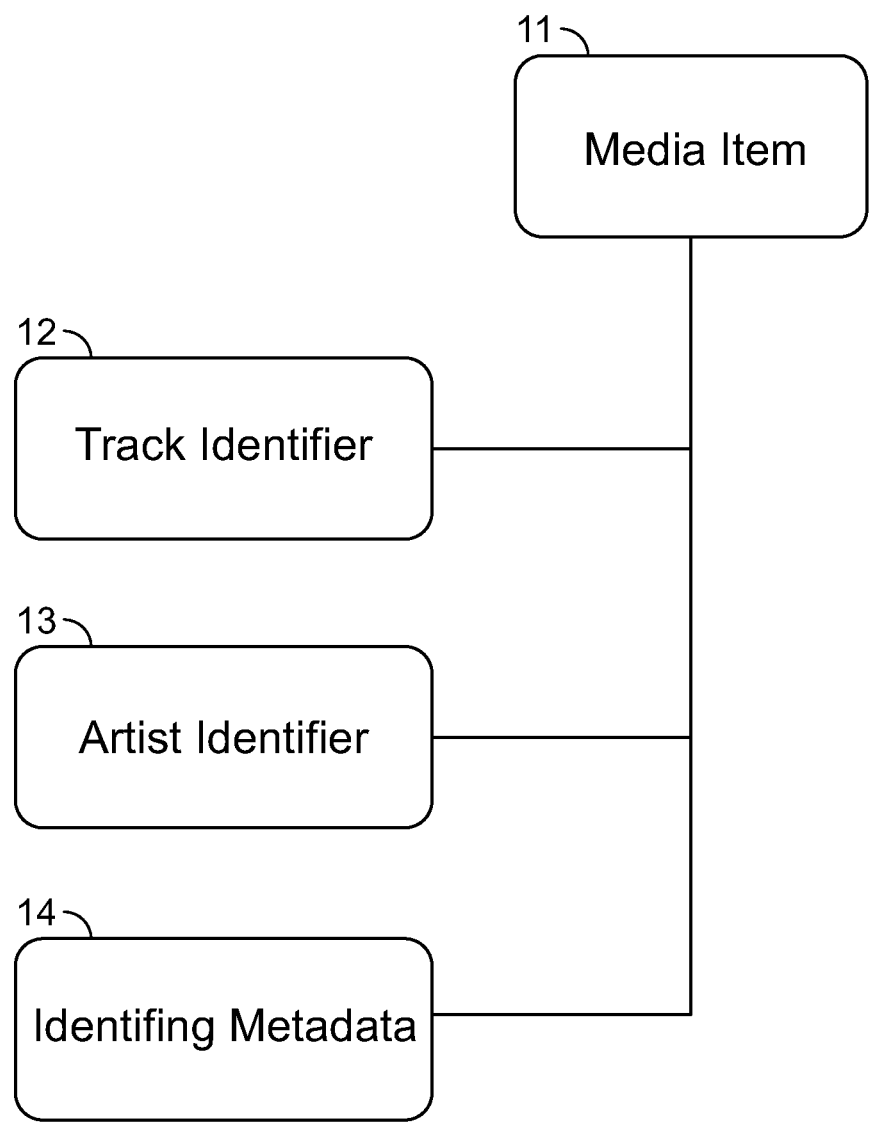
FIG. 3 is a schematic view of how a media item such as a song is classified in the first instance.

FIG. 3 is a schematic view of the first embodiment of how a media item 11, such as a song is classified in the first instance.

In some embodiments, the field holds data that indicates a name of the content using a track identifier 12 and a name of an artist using an artist identifier 13. This content ID, if a music file, often contains the genre of the music played together with the song duration and other related metadata and other references including, but not limited to, International Standard Recording Codes (ISRC). Such other identifying metadata 14 is then used to further understand the unique characteristics of a media item 11.

Figure 4:
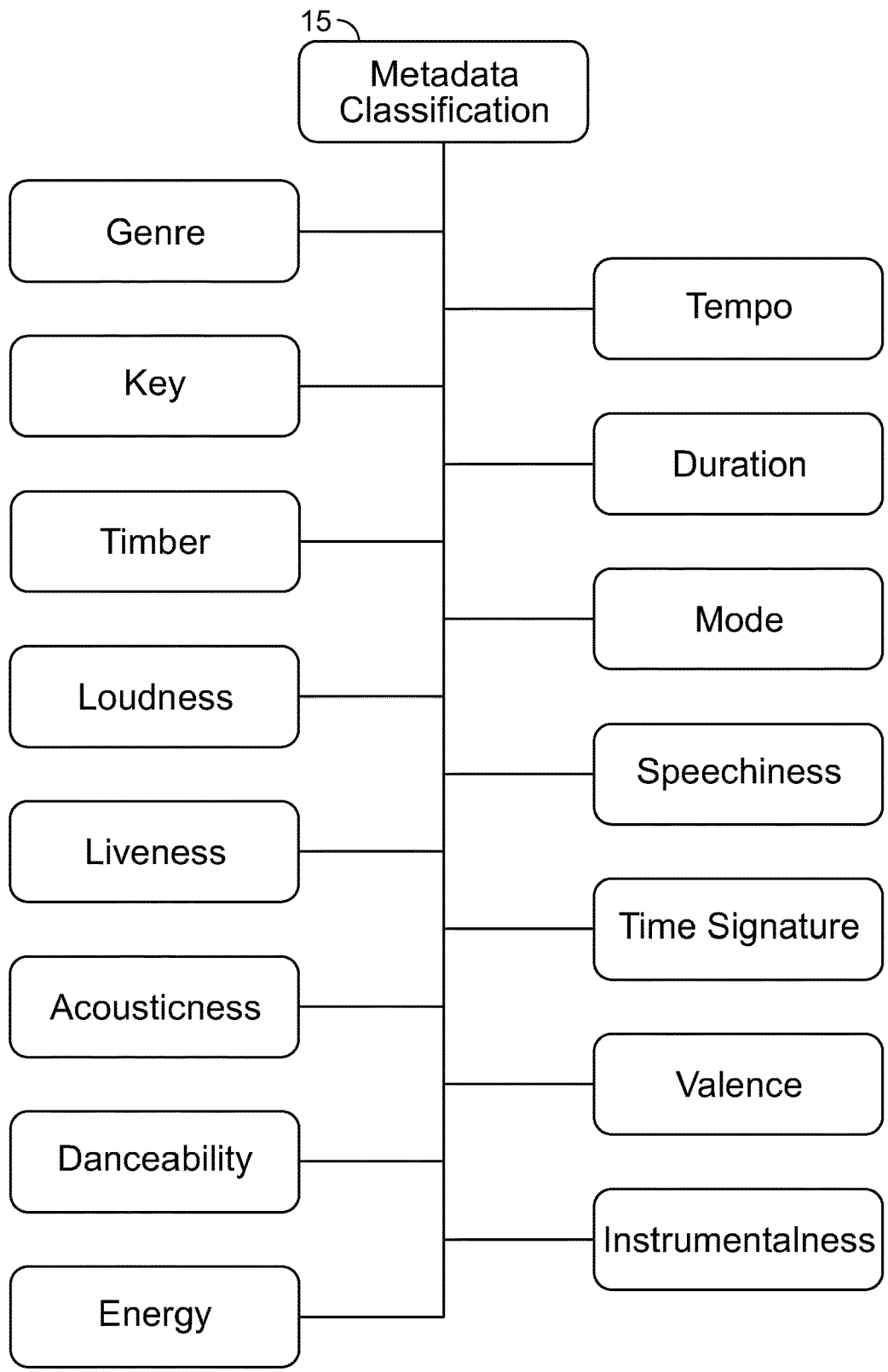
FIG. 4 is a schematic view of an embodiment of how the identifying metadata of such as a media item as a song is then labelled and classified.

FIG. 4 is a schematic view of the first embodiment of how the identifying metadata of such as a media item as a song is then labelled and classified.

The invention utilises a number of third party services that have classified catalogues of music using a wide range of variable characteristics. One example of such an embodiment includes The Echo Nest who have created "Analyze", a music audio analysis tool available as a free public web API (visit developer.echonest.com). The program takes a digital audio file from disk (e.g., mp3, m4a, way, aif, mov, mpeg, fly), or audio data piped in on the command line. It generates a JSON-formatted text file that describes the track's structure and musical content, including as a number of formats of metadata classification 15 including, but not limited to, Genre, Tempo, Key, Duration, Timbre, Mode, Loudness, Speechiness, Liveness, Time Signature, Acousticness, Valence, Danceability, Instrumentalness and Energy.

In addition to such classification tools provided by third party services, it should be noted that the invention has developed its own classification algorithms to further enhance the ability to work out key song characteristics, such as out key/mode classification algorithm set out below.

Figure 5:
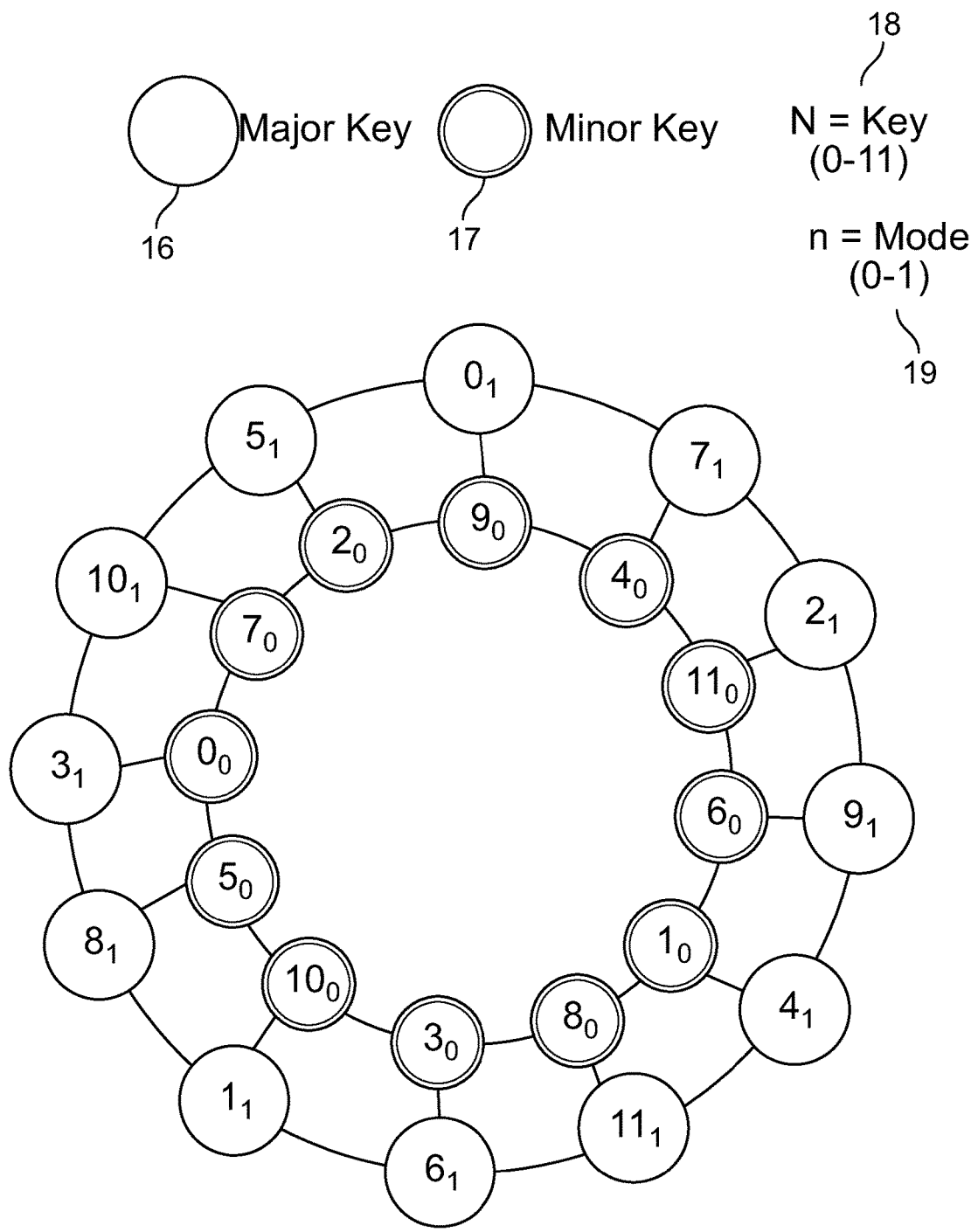
FIG. 5 is a schematic view of a key/mode classification algorithm that we have developed to further classify the relationship between major keys, minor keys and the overall modality of a song.

FIG. 5 is a schematic view of a key/mode classification algorithm that we have developed to further classify the relationship between major keys 16, minor keys 17 and the overall modality of a song 19 which ranges between (n) 19 1 (major) and 0 (minor). The major keys 16 and minor keys 17 are numbered in semitones (N) 18 from C (0) to B (11). This embodiment of the classification algorithm therefore relates each key with three others around it. It will be seen how this additional system of classification provides a better system for comparing songs with one another.

FIG. 6 is an example of the classification system used for one particular song, in this case 'Gimme Shelter' by The Rolling Stones using the metadata classification 15. Each media item will have a given set of results 20 for each parameter. The system then provides a range 21 which follows a canonical bound. For example, the range for a major key 16 is between 0 and 11. In this instance, 'Gimme Shelter' is played in the major key of C so a value of 1 is attributed to the result 20. The range 21 for a key is 3 as explained in FIG. 5. Each result 20 will have a unique range 21 that best suits each particular characteristic. A weight 22 is then added to each result 20. The reason for this is to ensure that when the similarity table between different media items is graphed, the system compares the most relevant results 20 and not those that would have less relevance. For example, the duration of a song would be of far less relevance when graphing the similarity table than the genre type. Accordingly, we give duration a weight of 0.1 and genre a weight of 0.7. All weights 22 vary between 0 and 1 with those of more relevance nearing 1 and those of less relevance nearing 0.

FIG. 7 is an example of a similarity table between two different songs; 'Gimme Shelter' by The Rolling Stones is Song A 23 and 'Summertime' by Ella Fitzgerald is Song B 24. Using the above-mentioned range 21, the system can work out what metadata classification results 20 are a match with one another 25. In this example, it can be seen that there is only one match 25 and this is for the results of loudness. Song A 23 has a loudness classification of 17 dB and Song B 24 has a loudness classification of 5 dB. The delta between these two results 20 is 12 dB which falls within the set range of 20 given to this particular characteristic. The system then uses the weight 22 for this result which is 0.6 to generate the match with weight 26.

FIG. 8 is an example of a similarity table between two different songs; 'Gimme Shelter' by The Rolling Stones is Song A1 27 and 'Baba O'Riley' by The Who is Song C 28. It can be seen how there are five matches between these songs; namely Genre, Tempo, Key, Timbre and Loudness for the given ranges and the match with weight score is then worked out to form an overall similarity score between Song A1 27 and Song C 28.

FIG. 9 is one embodiment of a similarity table comparing the song 'Gimme Shelter' by The Rolling Stones against, in the first instance, 'Summertime' by Ella Fitzgerald and in the second instance, 'Baba O'Riley' by The Who. The similarity score aggregated with weighting 29 is then worked out compared to the master song 'Gimme Shelter'. It can be seen that the similarity score aggregated with weighting 29 for 'Summertime' is just 0.6 whereas the similarity score aggregated with weighting 29 for 'Baba O'Riley' is 2.6. The system then divides the aggregated similarity score with weighting by the aggregate value of the weights to give the similarity score aggregated/weighting 30. It should be noted that for the smoothing algorithms that we run, described in more detail below, we have chosen to arbitrarily multiply the similarity score aggregated/weighting 30 by −1 in order to provide a negative value. It should be noted that the highest possible similarity score is therefore −1 and the lowest possible similarity score is 0 (as zero cannot have a negative value). In this embodiment, it is obvious that 'Summertime' with an overall similarity score of −0.18 is much less similar to 'Gimme Shelter' than 'Baba O'Riley' which has a relatively high similarity score of −0.82.

FIG. 10 is an example of a table format view for a graph with five different vertices. In this embodiment, each vertex represents a particular song in a playlist. Taking the above example of a five song playlist then given a starting song (one can choose any song since it will be somewhere on the path) there are N−1 choices for the second song in the path, N−2 choices for the third song in the path, and so on, leaving (N−1)! factorial possible paths: (N−1)!=(N−1)·(N−2)· (N−3)· . . . ·1. For 5 songs in a playlist, 4! is the number of possible paths, or 24 paths we have to examine to see which is the most optimal one. This is an exponential time problem. If one increases the number of outputs, then the time complexity quickly becomes enormous. For example, if there were eleven songs in the playlist, then 10! is the number of possible paths, or 3,628,800 paths have to be examined to see which is the most optimal one. The more songs added to the playlist, the more computations that are required to find out what the smoothest set list would be. For this reason, this is known in the field of computer science as NP complete. In order to deal with this time complexity issue and work out the best order in which this playlist should be played, the system uses a variety of smoothing algorithms to return the best approximate path.

FIG. 11 is a schematic view of a minimum spanning tree of the complete graph, as computed by MST-PRIM. Vertex a is the root vertex. Only edges in the minimum spanning tree are shown.

FIG. 12 is a schematic view highlighting a walk of the spanning tree, starting at a. A full walk of the tree visits the vertices in the order a; b; c; b; a; d; e; d; a. A preorder walk of the spanning tree lists a vertex just when it is first encountered, as indicated by the end of the arrow next to each vertex, yielding the ordering a; b; c; d; e. The total cost of this path is −1.29 (−0.29−0.38−0.22−0.4).

FIG. 13 is a schematic view of a tour obtained by visiting the vertices in the order given by the preorder walk, which is the tour returned by APPROX-TSP-TOUR.

FIG. 14 is a schematic view of an optimal tour for the original complete graph with the ordering a; b; c; e; d. The total cost of this path is −1.84 (−0.29−0.38−0.77−0.4). This path has a higher negative weight than the path identified in FIG. 13 and would be a smoother playlist order when generated using the system. However, as mentioned, using this brute force method to work out the optimal path becomes impossible as the number of possible outputs grows. In a playlist of any size, there needs to be a better system to order the songs in the most approximate manner.

Figure 15:
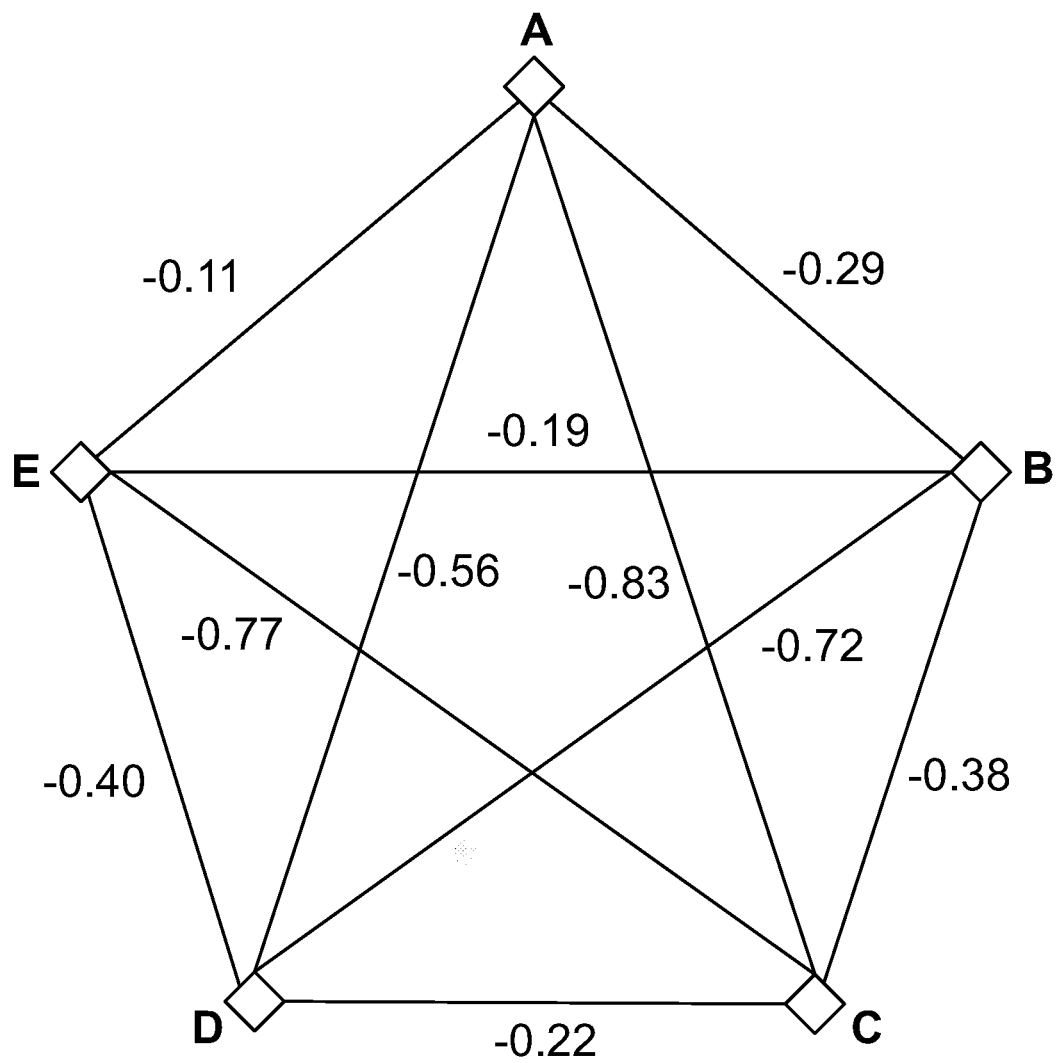
FIG. 15 is a diagram of five vertices plotted out in a vertex graph format with similarity scores included between each vertex.

FIG. 15 is a diagram of the same five vertices (or songs in a playlist) plotted out in a vertex graph format. Taking vertex A as a seed track (or reference point), we are able to use an Optimal Hamiltonian Path (OHP) algorithm to find out which is the most optimal path for this playlist and by association, which ordering of the songs would return the smoothest playlist. The benefits of using the OHP is that we only ever traverse each vertex on the graph once and only once. This ensures that the playlist returned by the system contains no duplication. Another way to work out the optimal path is by using the nearest-neighbour algorithm. Taking the reference point A, we walk the graph to the next vertex looking for the highest negative weight (e.g., similarity score between songs), crossing each vertex only once until there are no vertices left to cross. Using the nearest-neighbour algorithm from reference point A, the optimal path would be a; c; e; d; b. The total cost of this path is −2.72 (−0.83−0.77−0.4−0.72). This is significantly higher than the total cost of the path from FIGS. 13 and 14 and is an example of how this methodology can return a smoother playlist (e.g., an order that captures the most similar songs to one anther). It should be noted that the nearest-neighbour algorithm assumes that we have a reference point. As explained in further detail below in FIG. 20, the system does allow for a user to seed a track so that the first song of a playlist can be manually chosen. In cases, where a user does not seed a track, the system can use the repetitive nearest-neighbour algorithm to work out which track to seed and what optimal path to then follow for the playlist.

Figures 16, 17:
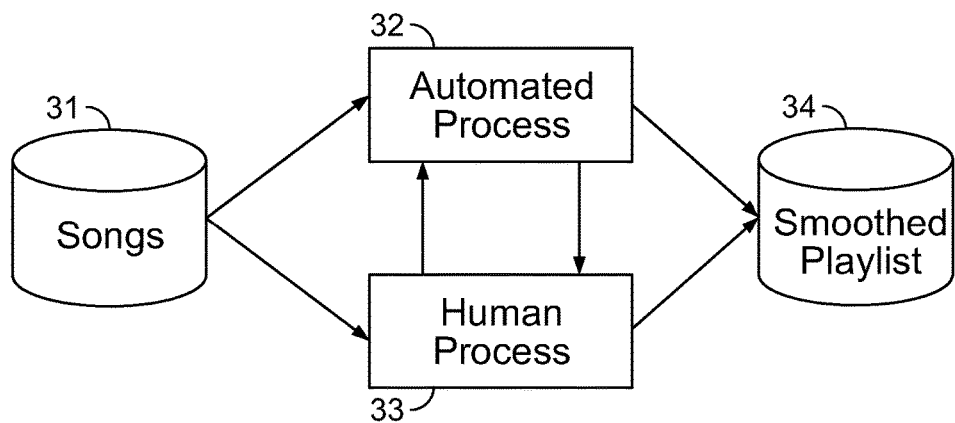
FIG. 16 is a table view of the OHP using the repetitive nearest-neighbour algorithm.
FIG. 17 is a schematic view of how our system combines an automated process with a human input process.

FIG. 16 is a table view of the OHP using the repetitive nearest-neighbour algorithm. It can be seen that this path e; c; a; d; b has a total weight of −2.88 (−0.77−0.83−0.56−0.72) which is a higher negative weight than the path identified in FIG. 15 with A as a reference point. In a practical example, and assuming that a user has not seeded the first track of the playlist, then the smoothest playlist in this case that best reflects the similarity scores between all songs in the playlist would be 'Seven Nation Army' by The White Stripes, followed by 'Figure It Out' by Royal Blood, followed by 'My Hero' by The Foo Fighters, followed by 'Whole Lotta Love' by Led Zeppelin, followed by the last song in the playlist, 'Next Girl' by The Black Keys.

The system of the invention operates in such a way that the system makes use different smoothing algorithms for different situations. For example, the nearest-neighbour approach may not be the best method with a large playlist (e.g., 100 songs) as it is relatively greedy as solutions to an NP complete problem like this. In other cases, an approximation methods can be used which are less optimal but provide as good a listening experience for the end user and a satisfactorily smooth playlist on the whole.

It should be noted that the system also provides for human input which effects the way that a playlist may be ordered. This means that certain algorithms cannot be used (e.g., repetitive nearest neighbour) when a user seeds the first track of a playlist (or reference point in the graph). Similarly, the system allows for a user to manually filter how they would like the playlist to be ordered based on a particular preference. For example, a DJ might want to group dance tracks with a BPM of 120 together. By applying this filter, the resulting playlist order will be driven by the tempo first and foremost. To do this the system artificially increases the weighting for this particular characteristic so that the similarity score will be higher for songs with a BPM closer to the desired result of 120. This is just one embodiment of how the system operates and multiple filters can be used to generate a playlist with the desired result.

FIG. 17 is a schematic view of how the system combines an automated process 32 with a human input process 33 to provide the most suitable smoothed playlist 34 for any particular situation. By way of example, a music listener may just want to create a smoothed playlist 34 for a party that they are hosting. By utilising the automated process 32, they could use the system to return a perfectly good playlist from a database of songs 31 at their disposal. If however the same party host wanted to create a playlist that was centred around acoustic rock music, they could do this through the human process method 33 by choosing the genre rock as a filter and a high acousticness requirement to be applied to the same song catalogue 31. The resulting playlist would be weighted in favour of these characteristics and the party host could therefore be satisfied knowing that the songs played would suit her desired music choice for that occasion.

Figure 18:
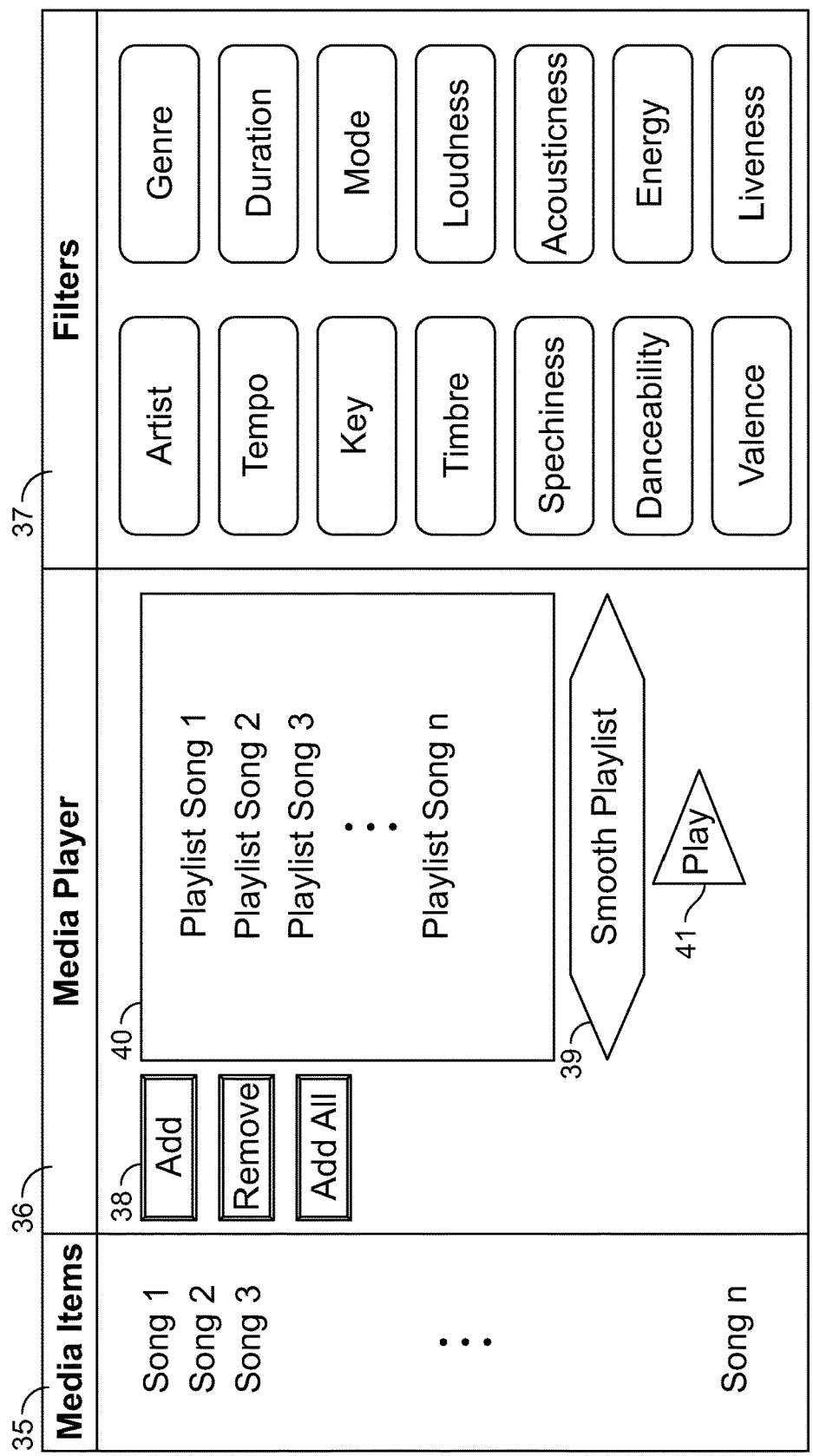
FIG. 18 is an example of a media player that uses a combined system of an automated process and human process.

FIG. 18 is an example of a media player 36 that uses the combined system of an automated process and human process to generate the most suitable playlist 40. In one embodiment the invention achieves this by first understanding what media items, Song 1 to Song n 35 are available. If a user decides to seed a track, that user can add it to the playlist by clicking on the add button 38. When the add button 38 is clicked, a playlist is then generated that fits or is similar to the selected song which is now referred to as a seed item and the selected song being added at the beginning of the playlist. The playlist is generated by estimating a user preference function based on characteristics of the selected track and identifying tracks in the media library that are likely to have high user preference. The selected song can be distinguished from other items in the playlist by, for example, displaying the selected song in a different colour and/or font. Additional songs can be added at anytime to library pane 40 and a user can find the best order for all songs by using the smooth playlist functionality 39. The playlist can be also be regenerated at anytime by determining a new user preference function using the filters 37 available to curate the type of playlist a user wants returned in the playlist viewing pane 40. The filters can be added by a user by clicking on any desired state (e.g., turning the artist filter on will ensure that the songs in the playlist viewing pane 40 best reflect that choice. Subsequently added tracks, also referred to as seed items, also can effect playlist regeneration. The returned order of Playlist Song 1 to Playlist Song n can then be played 41 and consumed by the user. The playlist songs listed in the playlist viewing pane 40 can be smoothed as often as a user wants using the smooth playlist functionality 39.

Figure 19:
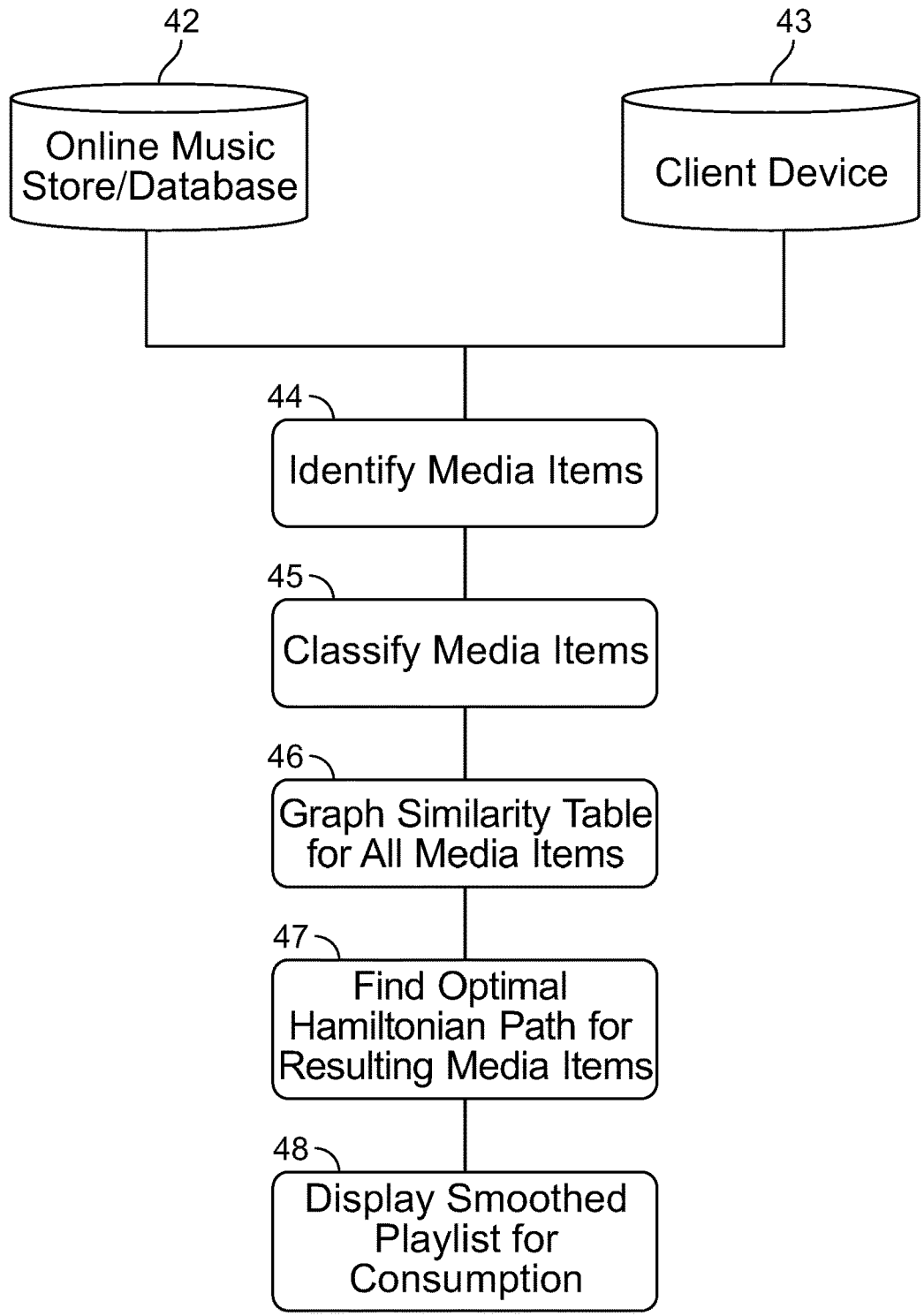
FIG. 19 is a schematic view of the automated process of the overall system, according to one embodiment.

FIG. 19 is a schematic view of the automated process of the system, according to one embodiment. Having explained the various steps required throughout in connection with classification, comparison and ordering of songs that provides the best smoothed playlist for any given circumstance, FIG. 19 gives an overview of how the system works in the absence of any additional human input. The system firstly analyses the source of the media items, being either an online music store/database 42 or on a client device 43. The system then identifies these media items 44 using an innovative approach to understanding the location, timestamp, user information and song metadata. Next the system classifies the media items 45 based on a range of available metadata characteristics for each song. Next the system graphs a similarity table for all the media items 46 and works out a similarity score between each song. Then the system finds the optimal Hamiltonian path for the resulting media items 47 and orders the songs accordingly. Finally, the system then returns and displays a smoothed playlist for consumption 48 by the end user.

Figure 20:
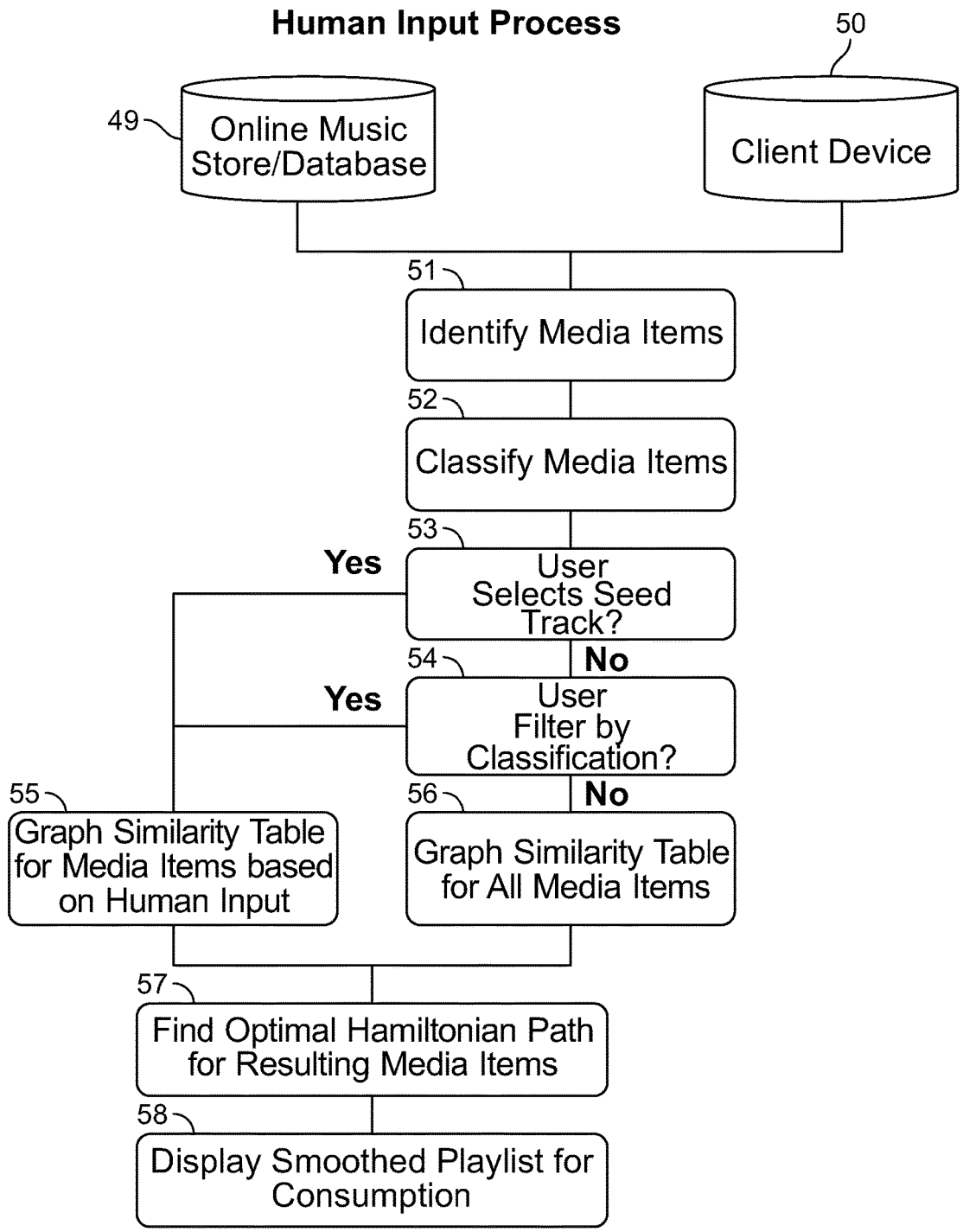
FIG. 20 is a schematic view of the human input process of the overall system, according to one embodiment.

FIG. 20 is a schematic view of the human input process of the system, according to one embodiment. The system firstly analyses the source of the media items, being either an online music store/database 49 or on a client device 50. The system then identifies these media items 51 using the innovative approach to understanding the location, timestamp, user information and song metadata. Next the system classifies the media items 52 based on a range of available metadata characteristics for each song. If a user then selects a seed track 53 or filters the media items by classification 54 the system graphs a similarity table for the media items based on the human input 55. If no such human input is provided, the system graphs a similarity table for all the media items 56. Then the system finds the optimal Hamiltonian path for the resulting media items 57 and orders the songs accordingly. Finally, the system then returns and displays a smoothed playlist for consumption 58 by the end user.

Thus the reader will see that at least one embodiment of the system provides a more comprehensive and efficient approach to classifying, comparing and smoothing media items for playlist generation. Furthermore, the method and apparatus described has the additional advantages in that:
- it identifies content in the most efficient manner possible using complimentary methods to ensure that the correct song is identified;
- it allows for additional classification techniques to be used to distinguish media items from one another;
- it allows for detailed comparison of media items to one another in order to graph a similarity score in the most efficient manner;
- it allows for the weighting of these comparable variables between songs in order to find the best objective criteria for finding a likeness between songs.
- it allows for both an automated process and human input process when classifying what media items to include in a playlist;
- it allows for numerous ways to work out the most optimal path between songs in a playlist when ordering the media items using the most appropriate algorithm for each situation;
- it allows for the regeneration of playlists using this smoothing functionality at any stage;
- it provides a mechanism for users to then consume the songs that have been smoothed in any given playlist.

In accordance with an embodiment, an apparatus for classifying, comparing and ordering a plurality of digital files each file representative of a song, comprises: at least one processor; at least one memory including computer program code, at least one memory and the computer program code configured to, with the at least one processor, cause the apparatus to perform the step of classifying the digital files based on a range of available metadata characteristics associated with each digital file.

In accordance with an embodiment, the at least one processor and the at least one memory are further configured to initiate: the comparison between songs to analyse how similar each song is to the next using a system of classification.

In accordance with an embodiment, the at least one processor and the at least one memory are further configured to apply a weighting of comparable variables between songs in order to find the best objective criteria for finding a likeness between songs.

In accordance with an embodiment, the at least one processor and the at least one memory are further configured to provide the step of ordering of songs in a playlist based on their similarity to one another.

In accordance with an embodiment, the metadata characteristics comprises location, timestamp, user information and song metadata.

In accordance with an embodiment, the apparatus is capable of filtering results in order to group or cluster songs around any set of parameters.

In accordance with an embodiment, the processor is configured to output a graph of a generated similarity table for all files and works out a similarity score between each song and implementing an optimal Hamiltonian path for the resulting table and ordering the songs to smooth the overall playback and listening experience.

In accordance with an embodiment, a method for classifying, comparing and ordering a plurality of digital files each file representative of a song, comprises the step of classifying the digital files based on a range of available metadata characteristics associated with each digital file; comparing each songs to analyse how similar each song is to the next using a system of classification; ordering the songs to smooth the overall playback and listening experience for a user.

While the above description contains many specificities, these should not be construed as limitations on the scope, but rather as an exemplification of one or several embodiments thereof. Many other variations are possible. Accordingly, the scope should be determined not by the embodiments illustrated, but by the appended claims and their legal equivalents.

The embodiments in the invention described with reference to the drawings comprise a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g., CD-ROM, or magnetic recording medium, e.g., a memory stick or hard disk. The carrier may be an electrical or optical signal which may be transmitted via an electrical or an optical cable or by radio or other means.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

What is claimed is:

1. An apparatus for classifying, comparing and ordering digital files, said apparatus comprising:
    at least one processor;
    at least one memory including a computer program code, wherein the at least one memory and computer program code are configured to, with the at least one processor, cause the apparatus to perform a method comprising:
    classifying each digital file of a plurality of digital files according to a plurality of metadata characteristics associated with, and describing musical characteristics of, the digital file, wherein the digital file is representative of a song track or other musical content;
    generating, in association with the plurality of digital files, a plurality of similarity scores, wherein each similarity score of the plurality of similarity scores between one digital file and other digital file of the plurality of digital files, is an aggregation of a plurality of weight scores corresponding to the plurality of metadata characteristics, wherein generating the similarity score between the one digital file and the other digital file includes:
    for each metadata characteristic of the plurality of metadata characteristics associated with the one digital file and the other digital file,
    determining a range and a weight associated with the metadata characteristic,
    comparing a first value of the metadata characteristic associated with the one digital file, with a second value of the metadata characteristic associated with the other digital file, and
    upon determining that a difference between the first value and the second value is within the range associated with the metadata characteristic, associating a match value with the metadata characteristic, and applying the weight to the match value associated with the metadata characteristics to determine a weight score for the metadata characteristic; and
    aggregating determined weight scores corresponding to the plurality of metadata characteristics to generate the similarity score between the one digital file and the other digital file;
    subsequent to generating the plurality of similarity scores for the plurality of digital files, determining a path associated with the plurality of digital files, based on the plurality of similarity scores for the plurality of digital files; and
    generating a playlist that includes a selection of the plurality of the digital files ordered in accordance with the determined path.

2. The apparatus of claim 1, wherein the plurality of similarity scores compare a selected digital file of the plurality of digital files, with each of other digital files of the plurality of digital files.

3. The apparatus of claim 2, wherein the selected digital file corresponds to a seed item selected in response to a user input.

4. The apparatus of claim 1, wherein the plurality of similarity scores compare all digital files of the plurality of digital files with one another.

5. The apparatus of claim 1, wherein the method further comprises, in response to determining that the difference between the first value and the second value is outside of a range for the metadata characteristic, excluding the metadata characteristic from determination of the weight score.

6. The apparatus of claim 1, wherein determining the path comprises:
    taking a first digital file of the plurality of digital files as a starting point in the path, and
    selecting another digital file of the plurality of digital files as a next digital file in the path, the another digital file having the highest similarity score relative to the first digital file, of the plurality of similarity scores.

7. The apparatus of claim 1, wherein determining the path comprises implementing an optimal Hamiltonian path approach to determine the path.

8. The apparatus of claim 1, wherein the method further comprises, in response to a user input indicative of filtering an ordering of the plurality of digital files according to a particular metadata characteristic of the plurality of metadata characteristics, applying an increased weighting for the particular metadata characteristic.

9. A method performed by an apparatus having at least one processor, and at least one memory including a computer program code, the method for classifying, comparing and ordering digital files, the method comprising:
    classifying each digital file of a plurality of digital files according to a plurality of metadata characteristics associated with, and describing musical characteristics of, the digital file, wherein the digital file is representative of a song track or other musical content;
    generating, in association with the plurality of digital files, a plurality of similarity scores, wherein each similarity score of the plurality of similarity scores between one digital file and other digital file of the plurality of digital files is an aggregation of a plurality of weight scores corresponding to the plurality of metadata characteristics, wherein generating the similarity score between the one digital file and the other digital file includes:
    for each metadata characteristic of the plurality of metadata characteristics associated with the one digital file and the other digital file,
    determining a range and a weight associated with the metadata characteristic,
    comparing a first value of the metadata characteristic associated with the one digital file, with a second value of the metadata characteristic associated with the other digital file, and
    upon determining that a difference between the first value and the second value is within the range associated with the metadata characteristic, associating a match value with the metadata characteristic, and applying the weight to the match value associated with the metadata characteristic to determine a weight score for the metadata characteristic; and aggregating determined weight scores corresponding to the plurality of metadata characteristics, to generate the similarity score between the one digital file and the other digital file;

subsequent to determining similarity scores for the plurality of digital files, determining a path associated with the plurality of digital files, based on the determined similarity scores for the plurality of digital files; and generating a playlist that includes a selection of digital files ordered in accordance with the determined path.

10. The method of claim 9, wherein the plurality of similarity scores compare a selected digital file of the plurality of digital files, with each of other digital files of the plurality of digital files, and the selected digital file corresponds to a seed item selected in response to a user input.

11. The method of claim 9, wherein the plurality of similarity scores compare all digital files of the plurality of digital files with one another.

12. The method of claim 9, further comprising, in response to determining that the difference between the first value and the second value is outside of a range for the metadata characteristic, excluding the metadata characteristic from determination of the weight score.

13. The method of claim 9, wherein determining the path comprises:
taking first digital file of the plurality of digital files as a starting point in the path, and
selecting another digital file of the plurality of digital files as a next digital file in the path, the another digital file having the highest similarity score relative to the first digital file, of the plurality of similarity scores.

14. The method of claim 9, wherein determining the path comprises implementing an optimal Hamiltonian path approach to determine the path.

15. A computer readable storage medium having instructions stored thereon to cause an apparatus having at least one processor, and at least one memory, to carry out a method for classifying, comparing and ordering digital files, the method comprising:
classifying each digital file of a plurality of digital files according to a plurality of metadata characteristics associated with, and describing musical characteristics of, the digital file, wherein the digital file is representative of a song track or other musical content;
generating, in association with the plurality of digital files, a plurality of similarity scores, wherein each similarity score of the plurality of similarity scores between one digital file and other digital file of the plurality of digital files is an aggregation of a plurality of weight scores corresponding to the plurality of metadata characteristics, wherein generating the similarity score between the one digital file and the other digital file includes:
for each metadata characteristic of the plurality of metadata characteristics associated with the one digital file and the other digital file,
determining a range and a weight associated with the metadata characteristic,
comparing a first value of the metadata characteristic associated with the one digital file, with a second value of the metadata characteristic associated with the other digital file, and
upon determining that a difference between the first value and the second value is within the range associated with the metadata characteristic, associating a match value with the metadata characteristic, and applying the weight to the match value associated with the metadata characteristic to determine a weight score for the metadata characteristic; and
aggregating determined weight scores corresponding to the plurality of metadata characteristics to generate the similarity score between the one digital file and the other digital file;
subsequent to generating the plurality of similarity scores for the plurality of digital files, determining a path associated with the plurality of digital files, based on the plurality of similarity scores for the plurality of digital files; and
generating a playlist that includes a selection of the plurality of the digital files ordered in accordance with the determined path.

16. The computer readable storage medium of claim 15, wherein the plurality of similarity scores compare a selected digital file of the plurality of digital files, with each of other digital files of the plurality of digital files, and the selected digital file corresponds to a seed item selected in response to a user input.

17. The computer readable storage medium of claim 15, wherein the plurality of similarity scores compare all digital files of the plurality of digital files with one another.

18. The computer readable storage medium of claim 15, wherein the method further comprises, in response to determining that the difference between the first value and the second value is outside of a range for the metadata characteristic, excluding the metadata characteristic from determination of the weight score.

19. The computer readable storage medium of claim 15, wherein determining the path comprises:
taking a first digital file of the plurality of digital files as a starting point in the path, and
selecting another digital file of the plurality of digital files as a next digital file in the path, the another digital file having the highest similarity score relative to the first digital file, of the plurality of similarity scores.

20. The computer readable storage medium of claim 15, wherein determining the path comprises implementing an optimal Hamiltonian path approach to determine the path.

* * * * *